US011416748B2

(12) United States Patent
Patil et al.

(10) Patent No.: US 11,416,748 B2
(45) Date of Patent: Aug. 16, 2022

(54) GENERIC WORKFLOW FOR CLASSIFICATION OF HIGHLY IMBALANCED DATASETS USING DEEP LEARNING

(71) Applicant: SAP SE, Walldorf (DE)

(72) Inventors: Ajinkya Patil, Heidelberg (DE); Waqas Ahmad Farooqi, Walldorf (DE); Jochim Fibich, Nussloch (DE); Eckehard Schmidt, Walldorf (DE); Michael Jaehnisch, Heidelberg (DE)

(73) Assignee: SAP SE, Walldorf (DE)

( * ) Notice: Subject to any disclaimer, the term of this patent is extended or adjusted under 35 U.S.C. 154(b) by 480 days.

(21) Appl. No.: 16/718,524

(22) Filed: Dec. 18, 2019

(65) Prior Publication Data

US 2021/0192354 A1 Jun. 24, 2021

(51) Int. Cl.
*G06N 3/08* (2006.01)
*G06N 3/04* (2006.01)

(52) U.S. Cl.
CPC .............. *G06N 3/088* (2013.01); *G06N 3/04* (2013.01)

(58) Field of Classification Search
CPC ........ G06N 3/088; G06N 3/04; G06N 3/0445; G06N 3/0472; G06N 3/0454; G06N 3/08; G06N 20/20; G06N 20/00; G06N 20/10; G06N 99/005
See application file for complete search history.

(56) References Cited

U.S. PATENT DOCUMENTS

| | | | |
|---|---|---|---|
| 7,467,105 B2 | 12/2008 | Roeckelein et al. | |
| 10,032,126 B2 | 7/2018 | Schmidt et al. | |
| 10,235,594 B2 | 3/2019 | Farooqi et al. | |
| 10,282,639 B2 | 5/2019 | Farooqi et al. | |
| 10,289,925 B2 | 5/2019 | Farooqi et al. | |
| 2016/0371606 A1 | 12/2016 | Schmidt et al. | |
| 2016/0371766 A1 | 12/2016 | Schmidt et al. | |
| 2017/0161633 A1* | 6/2017 | Clinchant | G06N 5/02 |
| 2017/0193335 A1* | 7/2017 | Montoro | G06N 3/0454 |
| 2017/0270429 A1* | 9/2017 | Bhattacharya | G06N 20/10 |
| 2019/0050465 A1* | 2/2019 | Khalil | G06F 16/258 |
| 2019/0279102 A1* | 9/2019 | Cataltepe | G06N 20/00 |

* cited by examiner

*Primary Examiner* — Yogeshkumar Patel
(74) *Attorney, Agent, or Firm* — Fish & Richardson P.C.

(57) ABSTRACT

Methods, systems, and computer-readable storage media for providing a binary classifier include receiving a biased dataset, the biased data set including a plurality of records, each record being assigned to a class of a plurality of classes, one class including a majority class, performing data engineering on at least a portion of the biased dataset to provide a revised dataset, providing a trained deep autoencoder (DAE) by training a DAE using only records assigned to the majority class from the revised dataset, the trained DAE including a binary classifier that classifies records into one of the majority class and a minority class, validating the trained DAE using validation data that is based on at least a portion of the biased dataset, and providing the trained DAE for production use within a production system.

20 Claims, 4 Drawing Sheets

FIG. 4

GENERIC WORKFLOW FOR CLASSIFICATION OF HIGHLY IMBALANCED DATASETS USING DEEP LEARNING

BACKGROUND

Binary classification can be described as classifying data of a dataset into two groups based on a classification rule. That is, binary classification includes predicting which group each record represented in the data belongs to. Binary classification becomes challenging in problems having complex features. In such cases, machine-learning (ML) algorithms are used to analyze and learn natural patterns in the data. Using ML, solid decision boundaries are created as hyperplanes in n-dimensional hyperspace. In binary classification, data on one side of the hyperplane is of a first class (e.g., type 0) and data on the other side of the hyperplane is of a second class (e.g., type 1).

In ML, binary classification can be implemented using an ensemble approach, which can include one or more ML algorithms (e.g., decision tree classifier, random forest classifier, ada boost, support vector classifier, logistic regression). However, the ensemble approach does not always provide sufficient accuracy in binary classification. For example, in the ensemble approach, the ML classifier is trained using a dataset, in which classes within the dataset are imbalanced, such that one class may be significantly more represented within the dataset than the other class. That is, there is a majority class and a minority class. In such cases, the ML classifier trained on the imbalanced dataset predicts data as the majority class and does not predict data as the minority class. This leads to a high of false positive rate in the predictions.

SUMMARY

In view of the above context, implementations of the present disclosure provide improved accuracy in binary classification using ML models that are trained based on biased datasets. More particularly, and as described in further detail herein, implementations of the present disclosure use a deep autoencoder (DAE) for binary classification, where the DAE is trained based on a single class of a biased dataset.

In some implementations, actions include receiving a biased dataset, the biased data set including a plurality of records, each record being assigned to a class of a plurality of classes, one class including a majority class, performing data engineering on at least a portion of the biased dataset to provide a revised dataset, providing a trained deep autoencoder (DAE) by training a DAE using only records assigned to the majority class from the revised dataset, the trained DAE including a binary classifier that classifies records into one of the majority class and a minority class, validating the trained DAE using validation data that is based on at least a portion of the biased dataset, and providing the trained DAE for production use within a production system. Other implementations of this aspect include corresponding systems, apparatus, and computer programs, configured to perform the actions of the methods, encoded on computer storage devices.

These and other implementations can each optionally include one or more of the following features: the DAE includes a first hidden layer having a different number of neurons than an input layer, and a second hidden layer having a different number of neurons than the first hidden layer; the DAE further includes a third hidden layer having a lower number of neurons than the second hidden layer and having a greater number of neurons than an output layer; data engineering includes one of reducing a dimensionality of records and expanding a dimensionality of records in the at least a portion of the biased dataset; data engineering includes scaling feature values of records in the at least a portion of the biased dataset; production use of the trained DAE includes providing a record as input to the trained DAE, receiving at least one value as output from the trained DAE, the at least one value being generated based on processing of the record through the trained DAE and representing an error in recreation of the record by the trained DAE, and assigning the record to one of the majority class and the minority class based on the at least one value; and the validation data includes records of the majority class and records of the minority class.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

In view of the above context, implementations of the present disclosure provide improved accuracy in binary classification using ML models that are trained based on biased datasets. More particularly, and as described in further detail herein, implementations of the present disclosure use a deep autoencoder (DAE) for binary classification, where the DAE is trained based on a single class of a biased dataset. Implementations can include actions of receiving a biased dataset, the biased data set including a plurality of records, each record being assigned to a class of a plurality of classes, one class including a majority class, performing data engineering on at least a portion of the biased dataset to provide a revised dataset, providing a trained deep autoencoder (DAE) by training a DAE using only records assigned to the majority class from the revised dataset, the trained DAE including a binary classifier that classifies records into one of the majority class and a minority class, validating the trained DAE using validation data that is based on at least a portion of the biased dataset, and providing the trained DAE for production use within a production system.

To provide further context for implementations of the present disclosure, and as introduced above, binary classification can be described as classifying data of a dataset into two groups based on a classification rule. That is, binary classification includes predicting which group each record represented within the data belongs to. Binary classification becomes challenging in problems having complex features. In such cases, machine-learning (ML) algorithms are used to analyze and learn natural patterns in the data. Using ML, solid decision boundaries are created as hyperplanes in n-dimensional hyperspace. In binary classification, data on one side of the hyperplane is of a first class (e.g., type 0) and data on the other side of the hyperplane is of a second class (e.g., type 1).

In ML, binary classification can be implemented using an ensemble approach, which can include one or more ML algorithms (e.g., decision tree classifier, random forest classifier, ada boost, support vector classifier, logistic regression). However, the ensemble approach does not always provide sufficient accuracy in binary classification. For example, in the ensemble approach, the ML classifier is trained using a dataset. In some instances, classes within the dataset are imbalanced, such that one class may be significantly more represented within the dataset than another class. More particularly, most real-world binary classification problems display class imbalance, which occurs when classes in the dataset do not make up an equal portion of the dataset. Example datasets include an imbalance of more than 80% (e.g., 80% of the data is of the first class (majority) and 20% of the data is of the second class (minority)). Many real-world applications suffer this bias in the dataset. A perfectly balanced dataset can be said to have an equal 50% distribution of both classes. Thus, theoretically, 51% to 49% is also an imbalance, but this small imbalance does not cause a significant hindrance to the ML models trained on such datasets. Whereas, if a higher bias (e.g., 80% to 20%; 90% to 10%) is present in the dataset, this significant imbalance causes the ML model trained on the biased dataset to be biased towards learning the patterns of the majority class, in such a way that the minority class might not be predicted at all.

In view of the above context, implementations of the present disclosure provide improved accuracy in binary classification using ML models that are trained based on biased datasets. More particularly, and as described in further detail herein, implementations of the present disclosure use a DAE for binary classification, where the DAE is trained based on a biased dataset. In some examples, data engineering (also referred to herein as data pre-processing) is performed on the biased dataset to provide a revised dataset. In some examples, data engineering includes changing (e.g., reducing, expanding) the dimensionality of the data (also referred to as feature engineering) and scaling the data to normalize the range of features. The DAE is trained based on a single class (majority class) of the revised dataset to provide a trained DAE. The trained DAE is tested using test data. If performance of the trained DAE is unsatisfactory (e.g., accuracy is below a threshold accuracy), one or more parameters of the DAE are changed, and the DAE is trained again. Example changes to parameters can include, but are not limited to, changing one or more of optimizer, loss and activation functions, changing normalization and regularization functions, changing number of hidden nodes and layers, changing the hyper parameters, and changing the architecture of the DAE. If performance of the trained DAE is satisfactory (e.g., accuracy is at or above a threshold accuracy), the trained DAE is put into production use. In production use, the trained DAE receives input data and classifies the input data as being in either a first class or a second class.

Implementations of the present disclosure are described in further detail herein with reference to example datasets that can be used to train a DAE. The example datasets include a credit card fraud detection dataset, a customer satisfaction dataset, and a safe driver prediction data set. Each of the example datasets is open-source data and is publicly available (e.g., at www.kaggle.com). Although example datasets are described herein, it is contemplated that implementations of the present disclosure can be realized using any appropriate dataset.

The credit card fraud detection dataset includes anonymized and numerical transactions from European banks from 2013, includes 284,807 records, where 284,315 are normal transactions (e.g., class 0), and 492 are fraudulent transactions (e.g., class 1), which provides a ratio of classes equal to 0.00173. The credit card fraud detection dataset includes 31 columns, each column representing a respective feature (e.g., data, time, amount). Accordingly, each row of the credit card fraud detection dataset represents a transaction (record), each transaction being described as a vector of feature values across the columns. In some examples, a column (e.g., the last column) is "class," which indicates whether the respective transactions are fraud (e.g., class 1) or non-fraudulent (e.g., class 0).

The customer satisfaction dataset is referred to as Santander Customer Satisfaction and includes anonymized and numerical transactions from a bank in Germany with 76,020 records, where 73,012 are transactions with satisfied customers (e.g., class 0), and 3,008 are transactions with unsatisfied customers (e.g., class 1), which provides a ratio of classes equal to 0.0412. The customer satisfaction dataset contains 371 columns, each column representing a respective feature. Accordingly, each row of the customer satisfaction dataset represents a transaction (record), each transaction being described as a vector of feature values across the columns. All the features are numerical, and a column "target" indicates respective classifications (e.g., 0 (customer is satisfied) or 1 (customer is not satisfied)).

The safe driver prediction dataset is referred to as Porto Seguro's Safe Driver Prediction and includes anonymized and numerical transactions from an insurance company in Brazil with 595,212 records of insurance claims, where 573,518 are non-fraudulent transactions (e.g., class 0), and 21,694 are fraudulent transactions (e.g., class 1), which provides a ratio of classes equal to 0.0378. In some examples, features that belong to groupings are tagged in the feature names, where feature names include a postfix noted as "bin" showing binary features and "cat" showing categorical features. Values of −1 indicate that the feature is missing from the observation. The safe driver prediction dataset contains 59 columns, each column representing a respective feature. Accordingly, each row of the safe driver prediction dataset represents a transaction (record), each transaction being described as a vector of feature values across the columns. All the features are numerical, and a column "target" indicates respective classifications (e.g., 0 (driver will not submit a claim) or 1 (driver will submit a claim)).

Implementations of the present disclosure are also described in further detail with reference to an example ML platform that includes SAP Leonardo ML, a cloud-based ML platform provided by SAP SE of Walldorf, Germany. It is contemplated, however, that implementations of the present disclosure can be realized in any appropriate ML platform.

Figure 1:
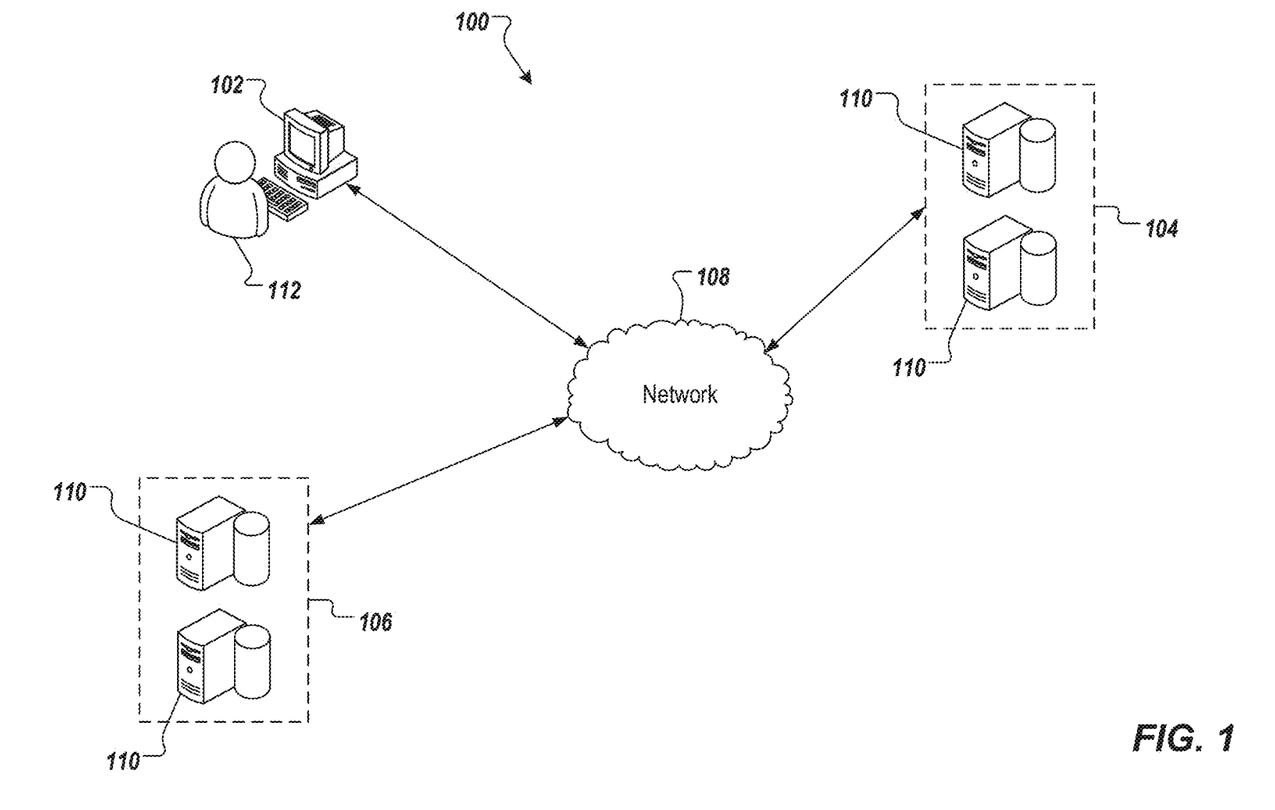
FIG. 1 depicts an example architecture that can be used to execute implementations of the present disclosure.

FIG. 1 depicts an example architecture 100 in accordance with implementations of the present disclosure. In the depicted example, the example architecture 100 includes a client device 102, a server system 104, a server system 106, and a network 108. The server systems 104, 106 each include one or more server devices and databases 110 (e.g., processors, memory). In the depicted example, a user 112 interacts with the client device 102.

In some examples, the client device 102 can communicate with the server systems 104, 106 over the network 108. In some examples, the client device 102 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server systems 104, 106 each include at least one server and at least one data store. In the example of FIG. 1, the server systems 104, 106 are each intended to represent various forms of servers including, but not limited to a web server, an application server, a proxy server, a network server, and/or a server pool. In general, server systems accept requests for application services and provides such services to any number of client devices (e.g., the client device 102 over the network 106).

In some implementations, the server system 104 can host a ML model training system, and the server system 106 can host a production system. For example, the ML model training system can include SAP Leonardo ML (introduced above) hosted on the server system 104, which can be used to provide a trained DAE in accordance with implementations of the present disclosure. In some examples, the trained DAE can be deployed to a production system hosted on the server system 106. In the production system, the trained DAE receives input data (e.g., data representative of a transaction) and classifies the input data into either a first class (e.g., non-fraudulent) or a second class (e.g., fraudulent).

Figure 2:
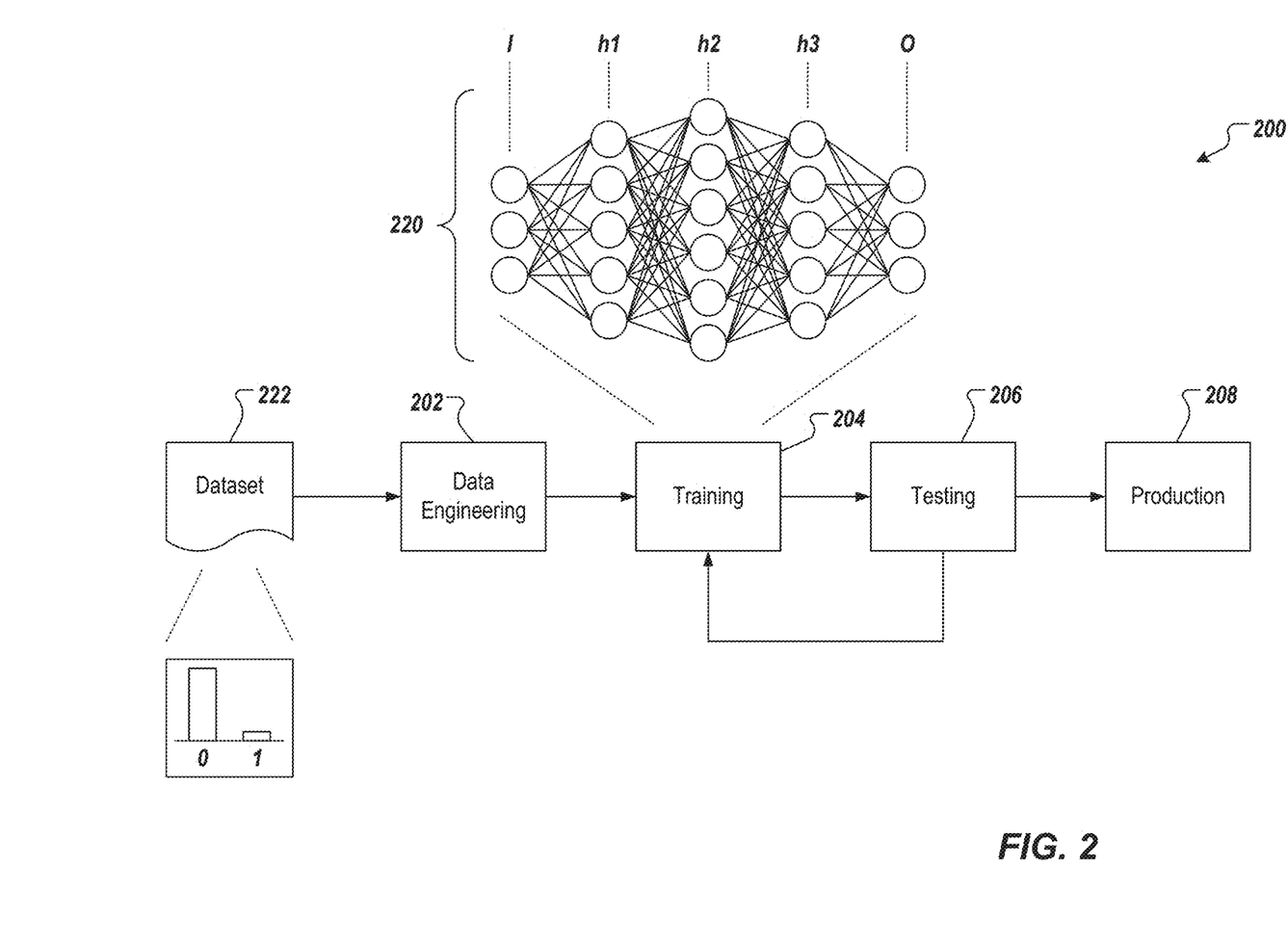
FIG. 2 depicts an example conceptual architecture that can be used to execute implementations of the present disclosure.

FIG. 2 depicts an example conceptual architecture 200 in accordance with implementations of the present disclosure. The example conceptual architecture 200 includes a data engineering module 202, a training module 204, a testing module 206, and a production system 208. As described in further detail herein, a DAE 220 is trained based on a dataset 222 to provide a trained DAE that is deployed to the production system 208.

In further detail, the dataset 222 includes imbalanced data, which includes data of a first class (e.g., class 0, non-fraudulent) and data of a second class (e.g., class 1, fraudulent). In some examples, the imbalance favors the first class over the second class by a threshold ratio (e.g., at least 80/20, at least 90/10). Consequently, the dataset 222 is said to be biased (to the first class). In some examples, the dataset is received as a computer-readable file (e.g., a .CSV file). For example, data within the dataset is read in-memory (e.g., read into main memory of a computing system) from the computer-readable file for computation. In some examples, the dataset is received from a database or any other appropriate data storage platform. In some examples, the computer-readable file is read into a data frame. In some implementations, the data within the dataset is randomly divided into two sub-sets, a first sub-set of data (training data) used for training the DAE to provide a trained DAE, and a second sub-set of data (validation data) is used for testing the trained DAE. In some examples, the first sub-set of data and the second sub-set of data are stored in separate computer-readable files. In some implementations, an open-source Python library, referred to as Pandas, is used to do perform the file input/output (I/O) operations. Pandas enables computer-readable files to be read directly into a data frame and enables writing a data frame to a CSV formatted file.

In some implementations, the data engineering (data pre-processing) module 202 processes data of the dataset 222 to provide a revised dataset. In some examples, the revised dataset includes the same transactions (records), but each transaction has a changed dimensionality (also referred to as feature engineering) and feature values are scaled to normalize the range of feature values. In some examples, data engineering is performed on both the first sub-set of data (training data) and the second sub-set of data (validation data).

In classification problems, classification of a transaction is determined based on a significant number of features. The higher the number of features, the harder it is to visualize the training data and use it. In many cases, features can correlate to one another, which can be seen as a redundancy within the features. In view of this, implementations of the present disclosure perform feature engineering (e.g., reduction, expansion). By way of non-limiting example, feature reduction (also referred to as dimensionality reduction) results in using less than all features of the training data. This avoids addition of unnecessary noise to the resulting ML model (i.e., the trained DAE), which would make the ML model more complex and less accurate than desired. It is contemplated, however, that feature expansion can be performed. For example, while redundant features can be removed, other features can be added to provide a more accurate ML model.

In feature engineering, a number of random variables under consideration is adjusted based on a set of key variables. In some implementations, algorithms (e.g., principal component analysis (PCA), decision tree classifiers (DTCs), deep learning models) are used to narrow down features based on their relative importance and determine which features to remove from the data. With reference to the example datasets introduced above, the credit card fraud detection dataset includes 31 features, the customer satisfaction dataset includes 371 features, and the safe driver prediction data set includes 59 features. Through feature reduction, the number of features are reduced to 17, 36, and 38 within respective revised datasets.

After feature reduction, the data is scaled. For example, many classifiers calculate the distance between two points by their Euclidean distance. If one of the features has a broad range of values, then the distance is governed by this feature. In accordance with implementations of the present disclosure, scaling is used to normalize the range of all of the features to achieve contributions from each feature proportionately to the final distance. Feature scaling is also applied to enable the convergence of an optimizer (e.g., ada boost, adam, stochastic gradient descent) to occur faster than it otherwise would without feature scaling.

In further detail, after the data is read from the computer-readable file to the data frames, the data frames are transformed using normalization. Example normalizers include, without limitation, a min-max normalizer and a standard normalizer. Using a min-max normalizer, the data is normalized to a fixed range (e.g., 0 to 1). A cost of having this limited range is that smaller standard deviations are seen, which can suppress the effect of outliers. In some examples, min-max normalizing is performed based on the following example relationship:

$$x' = \frac{x - \min(x)}{\max(x) - \min(x)}$$

where x is the value of a feature and x' is the normalized value of the feature. In standard normalizing, it is assumed that data is generally distributed within every feature and the data is normalized, such that the distribution is centered around 0 and has a standard deviation of 1. The mean, as well as standard deviation, are calculated separately for the feature, and the feature is normalized based on the following example relationship:

$$x' = \frac{x - \mathrm{mean}(x)}{stddev(x)}$$

where x is the value of a feature and x' is the normalized value of the feature.

Accordingly, the data engineering module 202 provides a revised dataset from the original dataset 222. For example, the data engineering module 202 provides at least a portion of the revised dataset as training data to the training module 204 that is used to train the DAE 220. In accordance with implementations of the present disclosure, and as described in further detail herein, a training dataset is provided that includes at least a portion of the revised dataset, and only includes data corresponding to transactions of the majority class (e.g., class 0).

If further detail, the idea of the DAE is to learn the patterns of the records represented within the datasets and predict in which class the new data records fall. In accordance with implementations of the present disclosure, the DAE is trained to provide a trained DAE that is used as a binary classifier. The strategy for training the DAE is to focus on training the DAE using only transactions that are from the majority class. In this manner, the DAE learns the patterns of and how to reconstruct transactions that correspond to the majority class.

To provide further context, a DAE is an artificial neural network that is able to learn efficient representations of input data, which is referred to as coding. DAEs function as powerful feature detectors. The restrictions provided by DAEs prevent merely copying of the inputs directly from input layers to output layers, which forces the DAE to learn efficient ways of representing the data. The DAE compresses or expands the input into code, which has lower-dimensions (in the case of compression) or higher-dimensions (in the case of expansion) and reconstructs the output from this lower-/higher-dimensional code. More plainly stated, the code is a compression/expansion of the input. A DAE includes three major components, encoder, code, and decoder. The encoder performs compression/expansion of the input and produces the intermediate code; the decoder reconstructs the inputs only using this intermediate code.

In accordance with implementations of the present disclosure, a non-conventional DAE is used to avoid compressing the feature vectors and to avoid reducing features for learning. Instead, the DAE of the present disclosure is trained to learn more and more about the standard transactions, because the DAE is to be used as a binary classifier. To achieve this, the architecture of the DAE is modified. Namely, in accordance with implementations of the present disclosure, the number of neurons in the hidden layers is enlarged, making it larger and then in the latter half reducing the number gradually so that to make sure that input layer and output layer has the same number of neurons. In this manner, the DAE of the present disclosure is forced to remember patterns of the transactions correctly and can be used as a binary classifier.

As depicted in FIG. 2, the DAE 220 includes two symmetrical deep belief networks consisting of two halves: an encoding half and a decoding half. In some examples, the layers are primarily restricted Boltzmann machine, the building blocks of deep-belief networks, each restricted Boltzmann machine layer communicates with both previous and subsequent layers. In some examples, the stack of the restricted Boltzmann machine ends with a function (e.g., SoftMax function, Hingeloss function), which functions as the output layer and classifies the input. More particularly, the SoftMax function converts vectors into class probabilities, and is used to normalize the vector of scores by the first exponentiation, which is then divided by a constant value. Except for the first and final layers, each layer in a deep-belief network has two roles: it serves as the hidden layer to the nodes that come before it, and as the input or a visible layer to the nodes that come after it.

Each circle in the DAE 220 of FIG. 2 represents a neuron-like unit called a node, the nodes representing where calculations are performed. The nodes are connected to each other across multiple layers, but no two nodes of the same layer are linked with each other. Each node is a locus of computation, which processes the given input and performs some operation on the input. In some examples, a separate weight multiplies each input value, the products are summed, added to bias, and the result is passed through an activation function (e.g., rectified linear unit (ReLu), hyperbolic tangent (tan h)) to produce the node's output. At every hidden node, an input x to the hidden node is multiplied by a respective weight w. The weights between two layers form a matrix where the rows are equal to the number of the input nodes, and the columns are equal to the number of the output nodes. Each hidden node gets multiple inputs multiplied by their weights. The sum of those products is then added again to the bias b, this addition forces an activation, and the result gets sent through the activation function, which produces a single output for each hidden node. The following example relationship illustrates the above discussion:

$$z = \sum_{i=1}^{n} w_i x_i + b$$

where z is provided as input to the activation function.

In the reconstruction phase, the activations of hidden layers becomes the input in a backward pass. The input passes and the same weights are multiplied, one per inter-node edge, just as 'x' was a weight-adjusted to the forward pass. The sum of all these products gets added with a bias to a layer at each node, and the output of all these operations is the reconstructed input (i.e., an approximation of the original input).

With regard to training, and as introduced above, the training module 204 trains the DAE 220 to provide a trained DAE. In some implementations, the keras library is used for training the DAE 220, and on each layer of the DAE either the ReLu activation function or the tan h activation is used. The keras library can be described as an open-source neural-network library that can be used to train DAEs and can be executed on TensorFlow. In some implementations, a loss is calculated using a loss function. An example loss function includes mean squared error (MSE). It is contemplated, however, that any appropriate loss function can be used. MSE can be described as an estimator that measures the average of the squares of the errors (or deviations), the error being the difference between the estimator and what is estimated. The difference occurs because the estimator does not take into consideration the information that could produce a more accurate estimate. The MSE is a measure of the quality of an estimator. The output of the MSE is always non-negative, and values closer to zero are better. MSE can be determined using the following example relationship:

$$MSE = \frac{1}{n} \sum_{i=1}^{n} (Yi - Y'i)^2$$

where Y' is the vector predicted for n samples and Y is the vector for n records observed values of the variables to be predicted. The difference is squared, and the same is summed for all records. The mean is determined by dividing with the original number of records.

By using keras as an abstraction on top of TensorFlow, the MSE is calculated at the end of each training epoch and the accuracy of the DAE at that current state of the training can be determined using the validation dataset. Keras enables the trained DAE to be saved in the ".h5" model format. The structure of the DAE can be changed by changing the number of hidden layers and the number of neurons in each hidden layer. As the DAE creates the input data at the output stage the number of neurons at an input and output layers are the same.

In some implementations, the trained DAE is provided to the testing module 206, which tests the accuracy of the trained DAE. More particularly, the trained DAE is in-memory, and the validation dataset (e.g., the second sub-set of the dataset 222) is used for checking the accuracy of the trained DAE. In some examples, the validation data is fed to the trained DAE, which recreates the input data at the output. The MSE loss on the validation dataset is calculated. Because the trained DAE only learned the patterns of the majority class, the recreation error for such data records from validation set is significantly less. However, the error for recreating the minority class is higher, because the trained DAE is incapable of recreating the minority class. This results in a separable two-dimensional chart, in which the error in reconstruction can be plotted. The records can be separated using a threshold error value. Records having an error less than the threshold are predicted as majority class, and records having an error exceeding the threshold are predicted as a minority class.

In some implementations, training of the DAE includes adjustment of one or more of, for example, weights, biases, learning rate, momentum rate, and dropout percentage between training epochs during a training session. The trained DAE is provided as the end of the training session. In some examples, the DAE is adjusted after the training session (e.g., if determined not to be sufficiently accurate). Adjustment of the DAE can include, without limitation, changing one or more of optimizer, loss and activation functions, changing normalization and regularization functions, changing number of hidden nodes and layers, changing the hyper parameters, and changing the architecture of the DAE.

If the trained DAE is determined to be sufficiently accurate based on the validation dataset, the trained DAE is deployed to the production system 208. In the production system 208, the trained DAE receives new transactions and classifies each transaction into either a first class or a second class. In some examples, the trained DAE receives a transaction represented as a vector of feature values, processes the transaction, and provides a probability that the transaction is of a first class (e.g., class 0). If the probability exceeds a threshold probability, the transaction is assigned to the first class. If the probability does not exceed the threshold probability, the transaction is assigned to the second class. For example, the production system 208 can include a credit card transaction monitoring system that uses the trained DAE to determine whether a new credit card transaction is non-fraudulent (e.g., class 0) or fraudulent (e.g., class 1).

Figure 3:
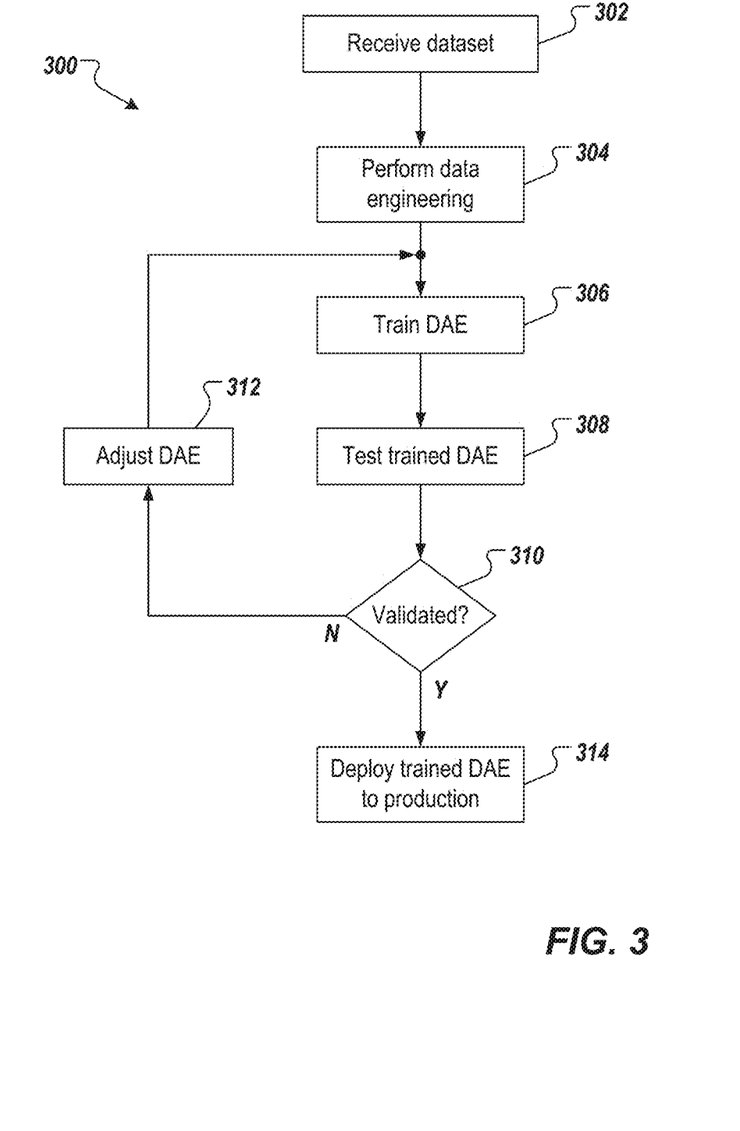
FIG. 3 depicts an example process that can be executed in accordance with implementations of the present disclosure.

FIG. 3 depicts an example process that can be executed in accordance with implementations of the present disclosure. In some examples, the example process 300 is provided using one or more computer-executable programs executed by one or more computing devices.

A dataset is received (302). For example, and as described in detail herein, the data engineering module 202 of FIG. 2 receives the dataset 222. In some examples, the dataset 222, or at least a portion thereof, is read in-memory (e.g., from a .CSV file), and the data engineering module 202 receives the dataset 22 from memory. Data engineering is performed (304). For example, and as described in detail herein, the data engineering module 202 performs data engineering on at least a portion of the dataset 222 to provide a revised dataset. In some examples, data engineering includes dimensionality adjustment and normalization, such that each record in the revised dataset is of a different dimension than in the dataset 222, and feature values in the revised dataset are scaled relative to one another.

The DAE is trained (306). For example, and as described in detail herein, the DAE is trained using at least a portion of the revised dataset. More particularly, the DAE is trained using only records of a majority class to provide a trained DAE. The trained DAE is tested (308). For example, and as described in detail herein, validation data is used as input to the trained DAE to determine an accuracy of the trained DAE. In some examples, the validation data is provided based on at least a portion of the dataset 222. In some examples, the validation data includes records of both the majority class and a minority class. It is determined whether the trained DAE is validated (310). For example, an accuracy of the trained DAE in view of the validation data is determined (e.g., as the MSE). If the accuracy exceeds a threshold accuracy, the trained DAE is considered to be validated. If the accuracy does not exceed the threshold accuracy, the trained DAE is not considered to be validated.

If the trained DAE is not validated, the DAE is adjusted (312) and the example process 300 loops back to re-train the DAE. For example, adjustment of the DAE can include, without limitation, changing one or more of optimizer, loss and activation functions, changing normalization and regularization functions, changing number of hidden nodes and layers, changing the hyper parameters, and changing the architecture of the DAE, and the DAE is again trained. If the trained DAE is validated, the trained DAE is deployed to a production system (314). For example, and as described in detail herein, the trained DAE can be deployed to the production system 208, such as SAP Leonardo ML, introduced above. In some examples, within the production system 308, the trained DAE receives a transaction (record) as input and provides a class that is to be assigned to the transaction as output.

As introduced above, using the trained DAE as a binary classifier in accordance with the present disclosure provides performance improvements over conventional binary classification approaches. For example, the trained DAE of the present disclosure provides improved accuracy over an ensemble approach, which can include one or more ML algorithms (e.g., decision tree classifier, random forest classifier, ada boost, support vector classifier, logistic regression). Table 1, below, provides a performance comparison between use of the trained DAE as a binary classifier and the ensemble approach based on each of the example datasets:

TABLE 1

Performance Comparison for Example Datasets

| Algorithm | Porto Seguro Dataset | Santander Bank Dataset | Credit Card Dataset |
|---|---|---|---|
| Support Vector Machines (SVM) | 58.99% | 67.61% | 97.95% |
| Random Forest Classifier | 95.40% | 85.46% | 99.10% |
| Gradient Boosting Classifier | 78.77% | 82.09% | 99.03% |
| Ada Boost | 73.51% | 72.71% | 96.26% |
| Logistic Regression | 59.69% | 66.46% | 97.81% |
| Decision Tree Classifier | 92.74% | 82.55% | 98.41% |
| Deep Auto Encoder | 96.11% | 86.22% | 99.78% |

For the above performance comparison, each of the conventional binary classifiers (i.e., the non-DAE classifiers) is trained using engineered data (e.g., reduced features, scaling), and equalizing the imbalance between the classes within the data. In some examples, an imbalance equalization technique (e.g., the Synthetic Minority Over-Sampling Technique (SMOTE), generative adversarial network (GAN)) is applied on the minority class (prior to data engineering) to create an equal ratio of records for each class. That is, each of the conventional binary classifiers is trained based on both classes of transactions.

Figure 4:
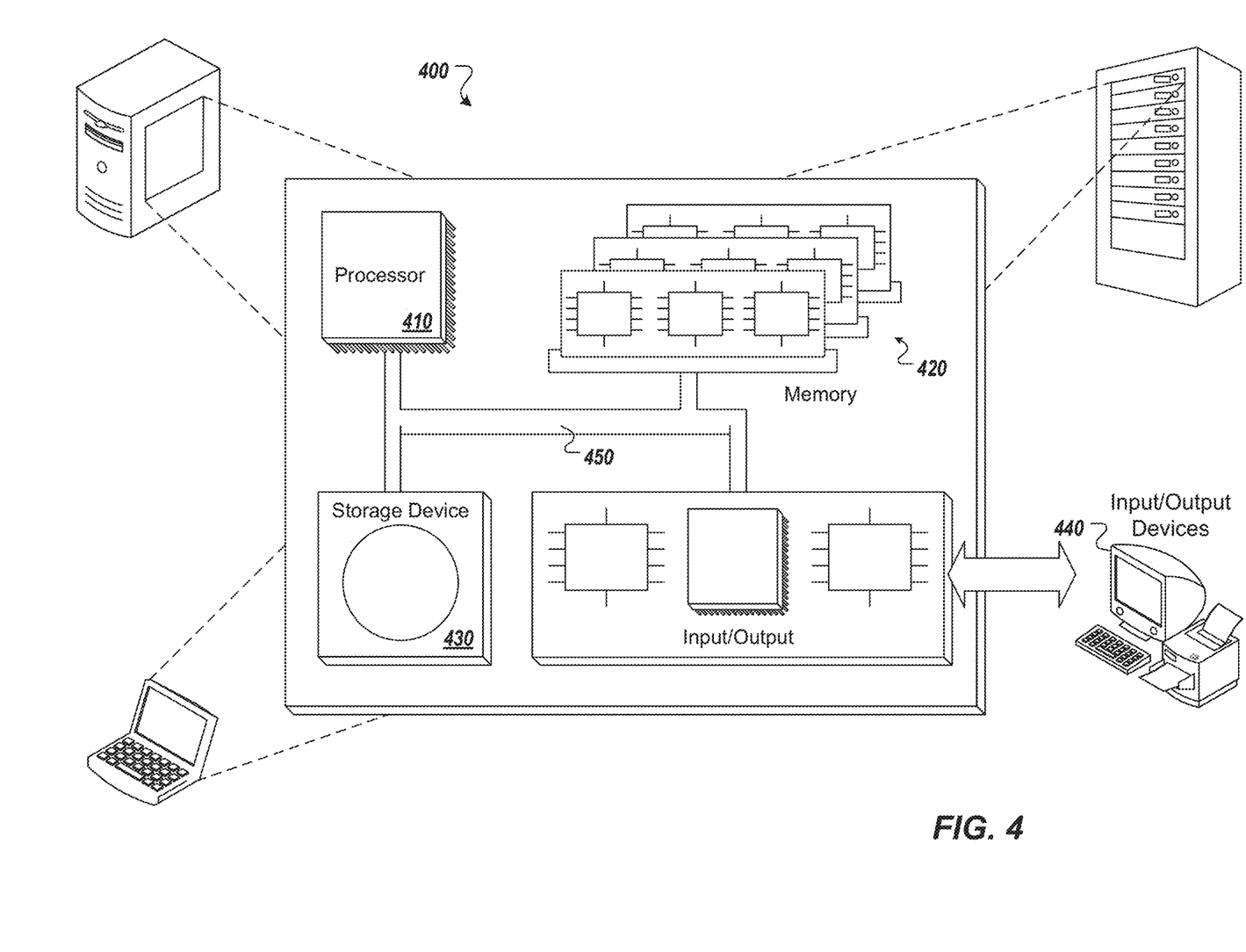
FIG. 4 is a schematic illustration of example computer systems that can be used to execute implementations of the present disclosure.

Referring now to FIG. 4, a schematic diagram of an example computing system 400 is provided. The system 400 can be used for the operations described in association with the implementations described herein. For example, the system 400 may be included in any or all of the server components discussed herein. The system 400 includes a processor 410, a memory 420, a storage device 430, and an input/output device 440. The components 410, 420, 430, 440 are interconnected using a system bus 450. The processor 410 is capable of processing instructions for execution within the system 400. In some implementations, the processor 410 is a single-threaded processor. In some implementations, the processor 410 is a multi-threaded processor. The processor 410 is capable of processing instructions stored in the memory 420 or on the storage device 430 to display graphical information for a user interface on the input/output device 440.

The memory 420 stores information within the system 400. In some implementations, the memory 420 is a computer-readable medium. In some implementations, the memory 420 is a volatile memory unit. In some implementations, the memory 420 is a non-volatile memory unit. The storage device 430 is capable of providing mass storage for the system 400. In some implementations, the storage device 430 is a computer-readable medium. In some implementations, the storage device 430 may be a floppy disk device, a hard disk device, an optical disk device, or a tape device. The input/output device 440 provides input/output operations for the system 400. In some implementations, the input/output device 440 includes a keyboard and/or pointing device. In some implementations, the input/output device 440 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for providing a binary classifier, the method being executed by one or more processors and comprising:
   receiving a biased dataset, the biased dataset comprising a plurality of records, each record being assigned to a class of a plurality of classes, one class comprising a majority class;
   performing data engineering on at least a portion of the biased dataset to provide a revised dataset;
   providing a trained deep autoencoder (DAE) by training a DAE using only records assigned to the majority class from the revised dataset, the trained DAE comprising the binary classifier that classifies records into one of the majority class and a minority class;
   validating the trained DAE using validation data that is based on at least a portion of the biased dataset; and
   providing the trained DAE for production use within a production system.

2. The method of claim 1, wherein the DAE comprises a first hidden layer having a different number of neurons than an input layer, and a second hidden layer having a different number of neurons than the first hidden layer.

3. The method of claim 2, wherein the DAE further comprises a third hidden layer having a lower number of neurons than the second hidden layer and having a greater number of neurons than an output layer.

4. The method of claim 1, wherein the data engineering comprises one of reducing a dimensionality of records and expanding a dimensionality of records in the at least a portion of the biased dataset.

5. The method of claim 1, wherein the data engineering comprises scaling feature values of records in the at least a portion of the biased dataset.

6. The method of claim 1, wherein the production use of the trained DAE comprises:
   providing a record as input to the trained DAE;
   receiving at least one value as output from the trained DAE, the at least one value being generated based on processing of the record through the trained DAE and representing an error in recreation of the record by the trained DAE; and
   assigning the record to one of the majority class and the minority class based on the at least one value.

7. The method of claim 1, wherein the validation data comprises records of the majority class and records of the minority class.

8. A non-transitory computer-readable storage medium coupled to one or more processors and having instructions stored thereon which, when executed by the one or more processors, cause the one or more processors to perform operations for providing a binary classifier, the operations comprising:
   receiving a biased dataset, the biased dataset comprising a plurality of records, each record being assigned to a class of a plurality of classes, one class comprising a majority class;
   performing data engineering on at least a portion of the biased dataset to provide a revised dataset;
   providing a trained deep autoencoder (DAE) by training a DAE using only records assigned to the majority class from the revised dataset, the trained DAE comprising the binary classifier that classifies records into one of the majority class and a minority class;
   validating the trained DAE using validation data that is based on at least a portion of the biased dataset; and
   providing the trained DAE for production use within a production system.

9. The computer-readable storage medium of claim 8, wherein the DAE comprises a first hidden layer having a different number of neurons than an input layer, and a second hidden layer having a different number of neurons than the first hidden layer.

10. The computer-readable storage medium of claim 9, wherein the DAE further comprises a third hidden layer having a lower number of neurons than the second hidden layer and having a greater number of neurons than an output layer.

11. The computer-readable storage medium of claim 8, wherein the data engineering comprises one of reducing a dimensionality of records and expanding a dimensionality of records in the at least a portion of the biased dataset.

12. The computer-readable storage medium of claim 8, wherein the data engineering comprises scaling feature values of records in the at least a portion of the biased dataset.

13. The computer-readable storage medium of claim 8, wherein the production use of the trained DAE comprises:

providing a record as input to the trained DAE;
receiving at least one value as output from the trained DAE, the at least one value being generated based on processing of the record through the trained DAE and representing an error in recreation of the record by the trained DAE; and
assigning the record to one of the majority class and the minority class based on the at least one value.

14. The computer-readable storage medium of claim 8, wherein the validation data comprises records of the majority class and records of the minority class.

15. A system, comprising:
a computing device; and
a computer-readable storage device coupled to the computing device and having instructions stored thereon which, when executed by the computing device, cause the computing device to perform operations for providing a binary classifier, the operations comprising:
receiving a biased dataset, the biased dataset comprising a plurality of records, each record being assigned to a class of a plurality of classes, one class comprising a majority class;
performing data engineering on at least a portion of the biased dataset to provide a revised dataset;
providing a trained deep autoencoder (DAE) by training a DAE using only records assigned to the majority class from the revised dataset, the trained DAE comprising the binary classifier that classifies records into one of the majority class and a minority class;
validating the trained DAE using validation data that is based on at least a portion of the biased dataset; and
providing the trained DAE for production use within a production system.

16. The system of claim 15, wherein the DAE comprises a first hidden layer having a different number of neurons than an input layer, and a second hidden layer having a different number of neurons than the first hidden layer.

17. The system of claim 16, wherein the DAE further comprises a third hidden layer having a lower number of neurons than the second hidden layer and having a greater number of neurons than an output layer.

18. The system of claim 15, wherein the data engineering comprises one of reducing a dimensionality of records and expanding a dimensionality of records in the at least a portion of the biased dataset.

19. The system of claim 15, wherein the data engineering comprises scaling feature values of records in the at least a portion of the biased dataset.

20. The system of claim 15, wherein the production use of the trained DAE comprises:
providing a record as input to the trained DAE;
receiving at least one value as output from the trained DAE, the at least one value being generated based on processing of the record through the trained DAE and representing an error in recreation of the record by the trained DAE; and
assigning the record to one of the majority class and the minority class based on the at least one value.

* * * * *